Aug. 31, 1965    M. T. SGRICCIA ETAL    3,203,530
SELECTION AND TRANSFER DEVICE FOR CONVEYORS
Filed Dec. 30, 1963                                 5 Sheets-Sheet 1

INVENTORS
MARIO T. SGRICCIA
DEAN V. BROWN
BY THOMAS C. McGOW

Price & Heneveld
ATTORNEYS

INVENTORS
MARIO T. SGRICCIA
DEAN V. BROWN
BY THOMAS C. McGOW

*Price & Heneveld*
ATTORNEYS

Aug. 31, 1965   M. T. SGRICCIA ETAL   3,203,530
SELECTION AND TRANSFER DEVICE FOR CONVEYORS
Filed Dec. 30, 1963   5 Sheets-Sheet 5
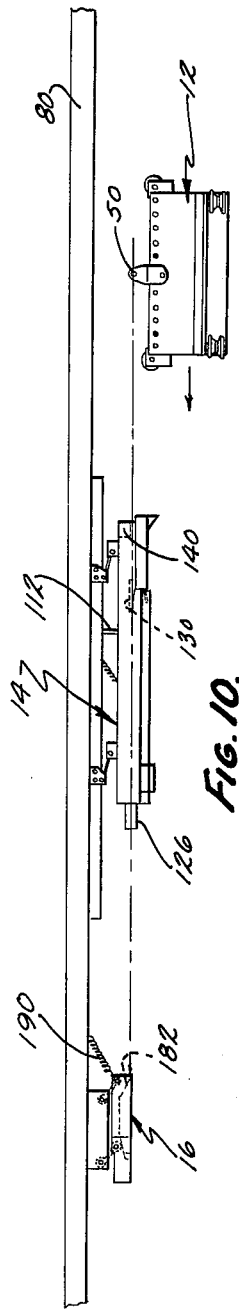
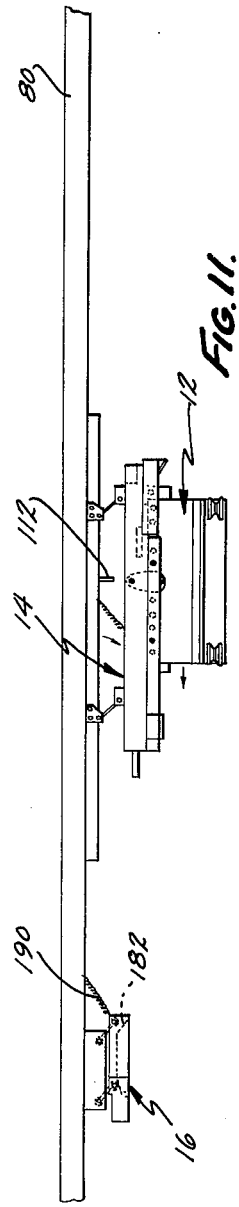
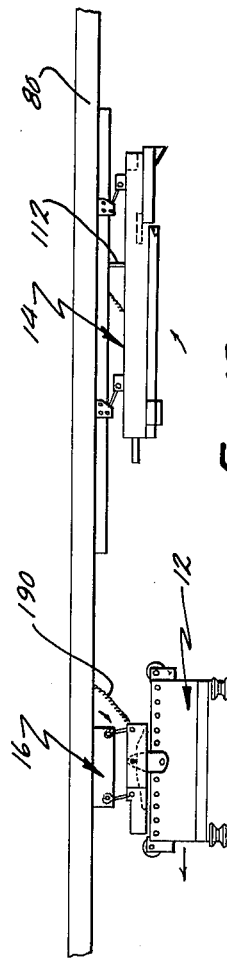
INVENTORS
MARIO T. SGRICCIA
DEAN V. BROWN
BY THOMAS C. McGOW
ATTORNEYS United States Patent Office 3,203,530
Patented Aug. 31, 1965

3,203,530
SELECTION AND TRANSFER DEVICE FOR CONVEYORS
Mario Thomas Sgriccia, Detroit, and Dean V. Brown, Port Huron, Mich., and Thomas C. McGow, Summit, N.J., assignors to Rapistan-Keystone, Inc., Detroit, Mich., a corporation of Michigan
Filed Dec. 30, 1963, Ser. No. 334,468
9 Claims. (Cl. 198—38)

This invention relates to conveyors, and more particularly to a mechanically functioning, carrier selection and reaction system, especially for unloading carriers from a conveyor.

This application is a continuation-in-part of patent application Serial No. 201,463 filed June 11, 1962 entitled Automatic Transfer for Conveyors.

Selective unloading of carriers at spaced stations along a conveyor is presently achieved with a variety of electrical and mechanical systems. Coding arrangements on the trolley and code reading systems along the carrier are employed to achieve the selection. This invention relates to the mechanically operated type.

According to function, the prior mechanical systems are generally one of two types. In the first type, the coded carrier cooperates with spaced reader units located at the discharge points. When a match occurs, the reader itself actuates an unloader mechanism, which responds and shifts the load, and often the carrier too, off the conveyor. In the second type when a match occurs, the reader itself moves into an unloading position to unload the carrier. With both of these types, the unloading reaction is simultaneous with the reading and selection function.

Experience has shown that it is often desirable and/or necessary for proper operation of complex conveying and handling systems to be able to delay the reaction on a conveyor, after the reading and selection has occurred. Typical reasons for this include (1) inability to mount the reader-selector-unloader combination directly in front of the discharge station, (2) the necessity or advisability of locating the reader and selector unit in one particular place along the conveyor, not at the discharge station, for control or observation of it, or any of several additional reasons. To attempt to achieve this separation of functions of reading and selection from unloading, and to provide a time interval of controlled duration between these functions, using present equipment or various combinations thereof, would involve elaborate, delicate, complex timing mechanism at best.

It is therefore an object of this invention to provide a carrier selection discharge system for conveyors causing the carrier code reading and selection to occur at one location along the conveyor, and carrier load discharge to occur at a subsequent chosen location a controlled but variable distance downstream of the reading and selection functions. It is another object of this invention to do this without any electrical means for timing or otherwise. Further, no complex mechanical timing means is needed. The apparatus causes the reaction on each selected carrier even though the reaction means is adjustably moved along the conveyor as desired. No supplemental timing adjustment need be made or timing means employed to cause the delayed reaction to occur at a different time interval when adjusting the reacting unit. The reaction occurs automatically upon the carrier engaging the reactor unit, if it is a selected carrier, and only if it is.

It is another object of this invention to provide a selective conveyor carrier unloading system which employs a reading and selector unit that not only achieves these two functions, but which also conditions the carrier itself to initiate the reaction upon itself by the reactor means downstream on the conveyor.

A further object of this invention is to provide a carrier selection reaction system for conveyors wherein the reacting device located a selected distance downstream of the reading and selective station is activated by shiftable mechanical means on the carrier itself, once it is conditioned in the reading station. The reactor is not activated directly by the reader. Nor does the reader react upon the carrier or its load. The reaction stress, usually one of unloading, is therefore not imparted to the code reader unit to lessen its accuracy of code reading.

Still a further object of this invention is to provide a carrier selection unloading system wherein only a small reactor unit, usually an unloader, need be placed adjacent the unloading station. The reader selector and carrier conditioner may be positioned at any desired location upstream on the conveyor so that only a small amount of space is consumed by the reactor unit adjacent the unloading station. This not only enables optimum use of space adjacent the unloading station, but also enables the positioning of the conditioning unit at a convenient location. Variations can therefore be readily imparted thereto by workmen. Easy observation thereof without the necessity to walk to the unloading station is another result.

Another object of this invention is to provide a selective carrier conveying system that can readily be set up to accomplish unloading of each trolley at any one of several different predetermined locations along the conveyor, while achieving a delayed reaction unloading with desired spacing of the code reader from the unloader. Further, it is possible to do all of this with a relatively inexpensive, completely mechanical system, employing shiftable pins, simple cam surfaces and sturdy shifting brackets. The apparatus is simple in construction, reliable in operation, easy to mount, easy to adjust in its position along the conveyor, free electrical wiring or signals, sturdy, free of delicate parts that would be prone to early failure and short life, readily and inexpensively manufactured and assembled, relatively quiet in operation, capable of variable complexity arrangements on any of several different types of conveying systems, with any selected number of unloaders and conditioners, and attachable directly to conventional conveyor track means such as an overhead trolley track. Both the reader and the reactor employ the force of a passing carrier to achieve the reading function, the selection function, the conditioning function, and the unloading function. The system is capable of handling one carrier after another in rapid sequence, at small space intervals.

Many additional advantages and unique features and functions of the inventive system will be readily apparent to those in this field upon studying the particular form of the invention disclosed and described herein, with reference to the drawings in which:

FIG. 10 is a plan view of the three components in FIG. 1;

FIG. 11 is a plan view of the apparatus in FIG. 10 with the trolley and reader units interengaged; and FIG. 12 is a plan view of the apparatus in FIG. 10 showing the trolley and the unloader unit interengaged.

Figure 1:
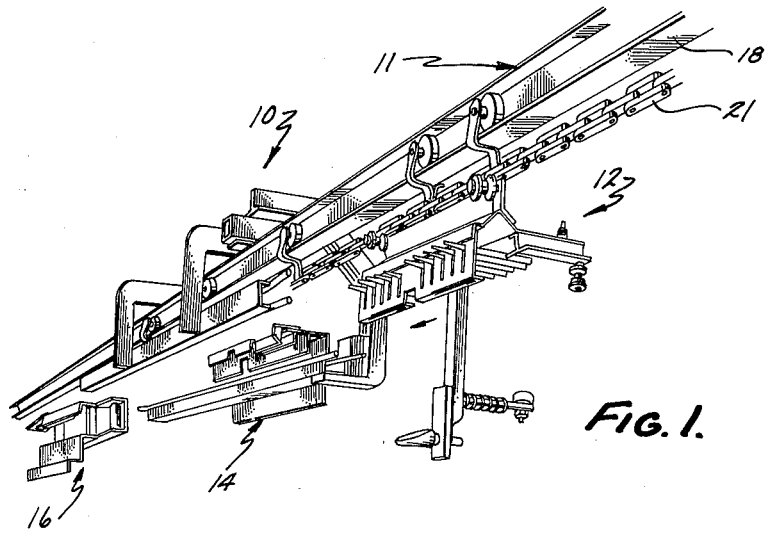
FIG. 1 is a perspective view of the three major components of the novel system, a carrier, a reader and selector, and a reactor, all shown in relation to and mounted on an overhead conveyor track means.

Referring now specifically to the drawings, the selector system assembly is illustrated in FIG. 1 at 10. It is shown to include one each of a trolley subassembly 12 movably supported on conveyor 11, a reader-selector-conditioner subassembly 14 affixed to conveyor 11, and an unloader subassembly 16, mounted to conveyor 11. It will be understood from the description to follow that a normal installation will include a plurality of trolleys 12, as well as a plurality of reader units 14 and a plurality of unloader units 16, with one unloader for each reader. Since these all are the same, only one of each is shown and described.

Figure 7:
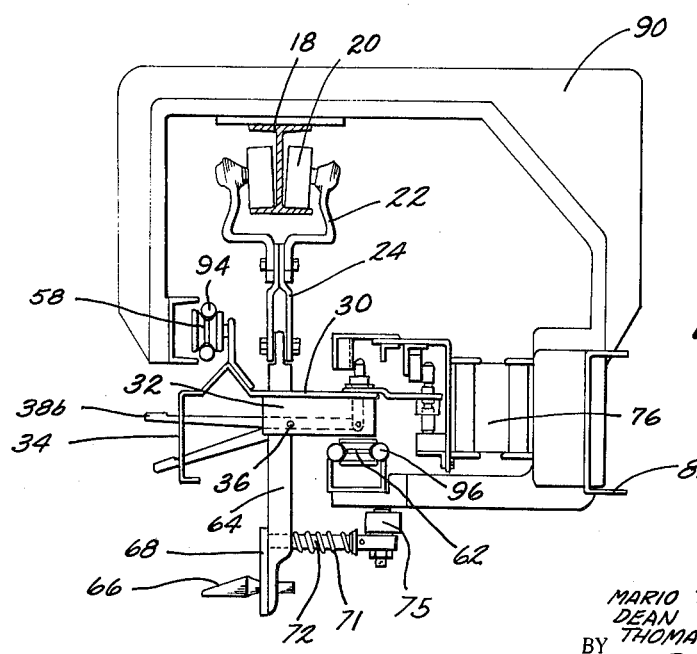
FIG. 7 is an end view of a trolley carrier interengaged with the reader unit.

The conveyor 11 here shown includes an overhead track 18. It will be realized that this is just one possible type of conveyor combined with the novel control system. This endless overhead track is generally I-shaped in cross section (FIG. 7). The lower flanges of the track support the trolley wheels 20, which are rotatably mounted on suspension brackets 22. These brackets are bolted to a suspension yoke 24, from which the main portion of trolley 12 is suspended. Each trolley is supported on two pairs of such brackets and rollers.

Each trolley carrier includes a generally horizontal platform 30 with downwardly depending end flanges 32 on opposite ends thereof, and a downwardly extending face plate 34. Mounted to extend between the two end flanges 32 is a support 36. This rod pivotally supports a plurality of levers arranged in two longitudinally spaced groups 38a and 38b. Each lever can be depressed from its normal horizontal position illustrated in FIG. 7 to a lowered position (also shown in FIG. 7).

Figure 2:
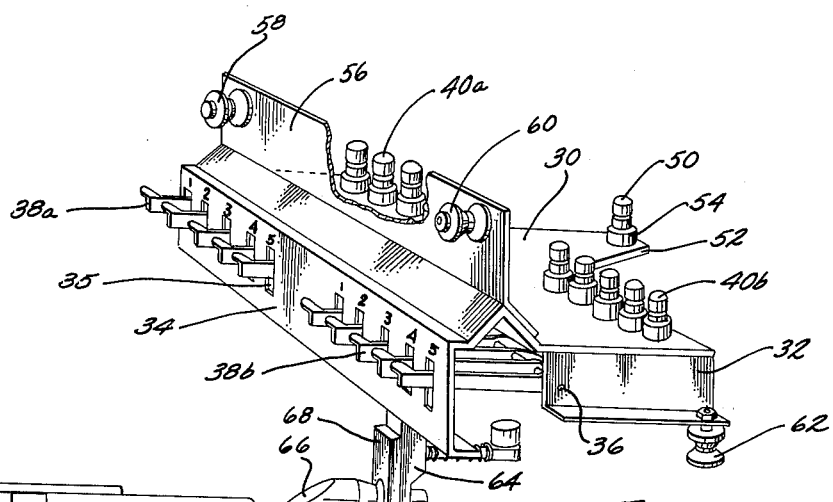
FIG. 2 is an enlarged perspective view of the trolley type carrier illustrated in FIG. 1.
Figure 6:
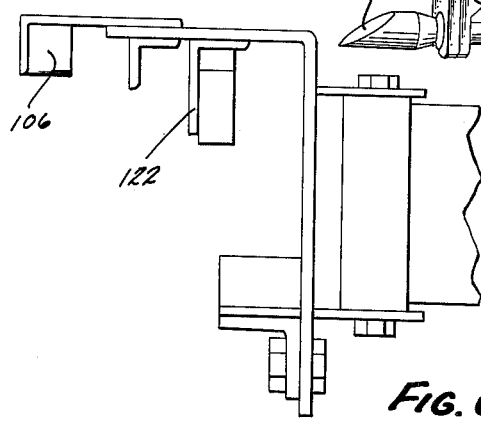
FIG. 6 is an end view of the unit in FIGS. 3, 4 and 5.

The rearward end of each lever is pivotally connected to the lower end of depressible-elevasteable groups of pins 40a and 40b, respectively, for lever groups 38a and 38b. Thus, each of these code pins is controlled by its respective lever to be positioned in a raised or lowered condition. Each pin has suitable holding means such as a ball detent means, both in the lowered and raised positions. Suitable slots 35 in face plate 34 of the trolley allow lever movement. Identifying indicia numbers are provided for each lever and pin, as in FIG. 2.

All of the code pins in groups 40a and 40b are in the same plane. Offset rearwardly from these code pins, and in the center of the trolley from end to end, is a master control pin or trigger element 50. This pin, supported on a rearwardly protruding flange 52 from main trolley platform 30 is also movable from a depressed condition to an elevated condition. The master pin, like the code pins, is held in either of these positions by cooperation of a suitable detent inside collar 54 with annular grooves around the pin (FIG. 7). The master pin is located not only generally centrally of the trolley but also between the spaced sets of code pins.

An elongated vertical support flange 56 on the trolley rotatably supports a pair of vertical guide rollers 58 and 60. A pair of horizontal guide rollers 62 is suspended on horizontal flanges on the opposite ends of the trolley on vertical axes.

An article support means extends beneath the main platform portion of the trolley. This means includes a suspension bar 64 fixed to the trolley to ride along therebeneath, and supporting a horizontally extending pin 66 for receiving garment hangers or the like. Straddling pin 66 is a wiper plate 68 biased against bar 64 by a compression coil spring 71 behind the bar. This spring is located on a rod 72 connected to the wiper plate, extending through bar 64, and having a cam follower roller 75 on the rearward end thereof. A biasing force against the roller 75 thus can compress spring 71 to force wiper 68 out over pin 66 to remove a load therefrom.

Each reading station 14 cooperates and interengages with each passing trolley that has pre-set code pins. Presetting of the code pins is achieved by depressing one of the levers in group 38a and one in 38b to elevate one pin in group 40a and one in group 40b.

Figure 4:
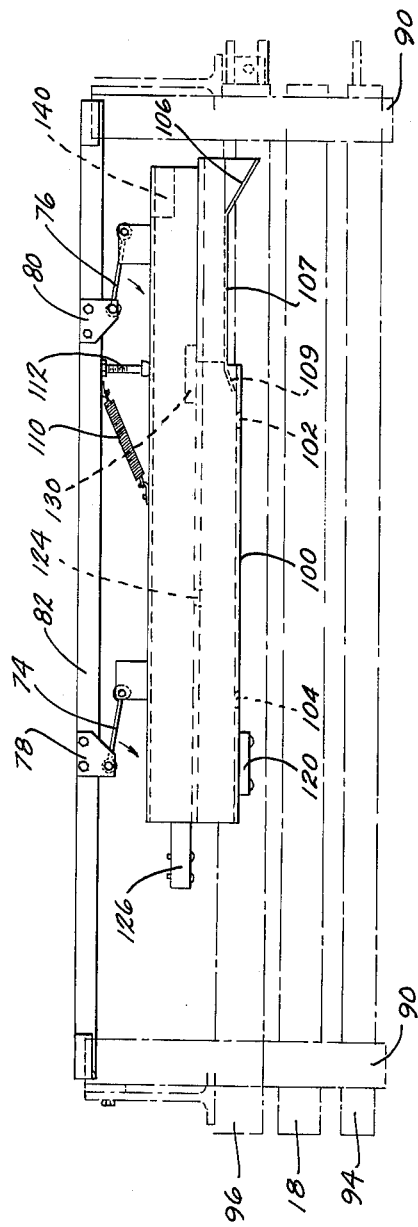
FIG. 4 is a plan view of the unit illustrated in FIG. 3.
Figure 5:
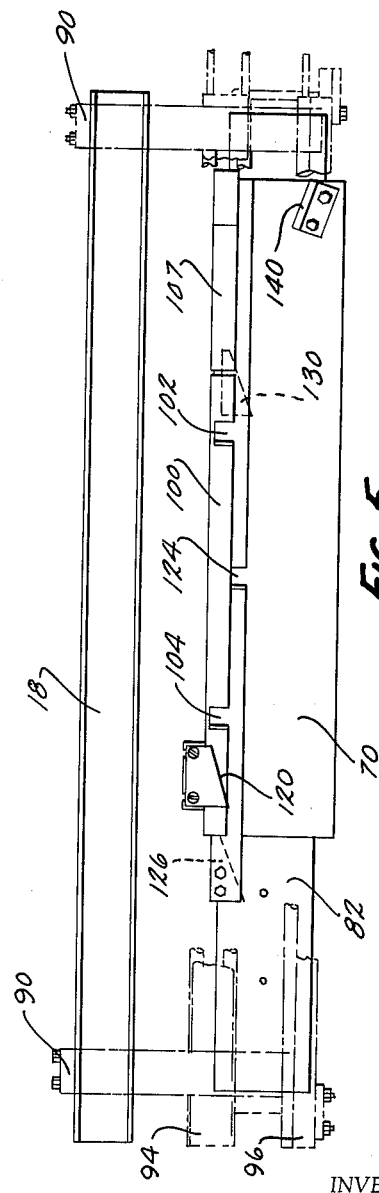
FIG. 5 is a front elevational view of the unit illustrated in FIGS. 3 and 4.

The reader unit includes a vertical rear panel 70 and an overhanging ledge 72. The rear panel 70 is pivotally mounted on a pair of hinge type leg elements 74 and 76 (FIG. 4). These hinge elements in turn have their rear ends pivotally mounted to supports 78 and 80 attached to a fixed channel section 82. Thus the channel 82, hinges 74 and 76, and the reader element constitute a parallelogram shiftable from a retracted position to an extended position. The shift occurs in the manner typical of a three bar linkage. This entire assembly is supported from conveyor track 18 by a cantilever type bracket 90 (FIG. 7) suspending channel element 82. This same bracket 90 supports vertical guide 94 and horizontal guide 96 cooperative with rollers 58 and 62 respectively of the trolley. These stabilizer guides 94 and 96 extend the length of the reader element as illustrated in FIG. 4. Like stabilizer elements may also be employed adjacent the unloader unit as will be described hereinafter.

The reader includes a frontal flange 100 having a pair of spaced code reading slots 102 and 104 to cooperate with the code pins on the trolley. It also includes a converging mouth portion at the leading end thereof defined by diagonal flange 106 and an adjacent planar guide surface 108 of angle element. This mouth receives the code pins which are elevated, to enable them to cooperate with the code reading flange and slots. The diagonal surface 106 also serves as a camming surface which, when abutted by the passing elevated code pins, causes the reader unit to be shifted laterally and longitudinally with respect to the conveyor, on its hinge elements, against the bias of tension spring 110 (FIG. 4). This moves it away from stop 112 extending from channel element 82. The elevated code pins then ride along the back side of flange 107, across the slightly diagonal lip 109 (FIG. 4), and onto the back side of flange 100 which includes the code reading slots.

A downwardly slanting cam surface 120 for depressing code pins which have passed through the code slots is mounted to the reader unit in front of flange 102 downstream of the code slots.

The downwardly depending flange 122 behind flange 100 includes a centrally located orifice 124 for passing the master pin in cases where the code pins match and pass through the code slots. This allows the master pin to move from behind the flange 122. It remains behind flange 122, the full length of the reader, it is depressed by downwardly slanting cam surface 126 at the downstream end of the reader unit, behind flange 122. It will be realized, and it will be explained more fully hereinafter, that if the master control pin is not allowed to pass through the orifice 124, and thus is depressed, it can not actuate the unloader unit 16 downstream of the reader. If it does pass through this slot, however, it is not depressed, and remains active to actuate the unloader in a manner to be described hereinafter.

Mounted to the front side of the support plate 70 is an upwardly sloping cam surface 140 which elevates the master pin of each trolley in which two code pins of the two groupings are preset. It will also elevate if only one code pin in the lead group 40a is preset, but will immediately be lowered by surface 130. Normally, the master pin is not aligned with cam surface 140 (FIG. 10) but only becomes aligned with it when the reader unit is extended forcefully against the bias of its tension spring by the cooperation of present elevated code pins on surface 106.

Mounted to the back side of flange 122 in the path of a pin passing along the back side is another downwardly slanting cam surface 130 at the lead end of the reader unit. The purpose of this cam surface is to depress the master pin in cases where only one code pin in group 40a is elevated and no code pins in group 40b are elevated to an active condition. This also will be discussed more specifically hereinafter.

Figure 8:
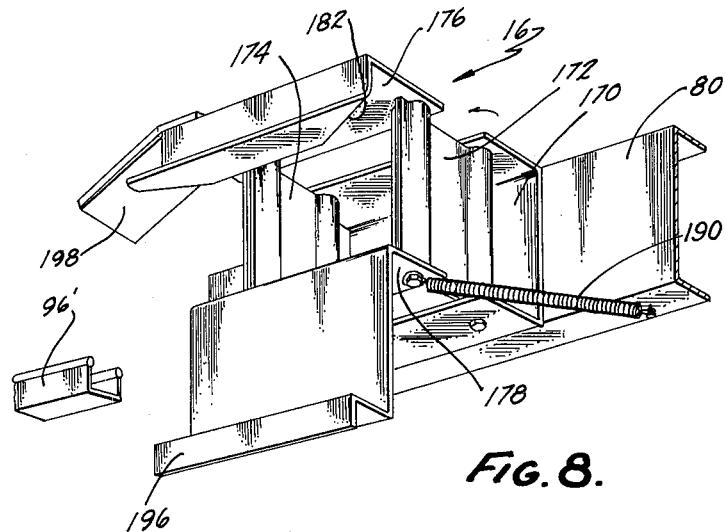
FIG. 8 is an enlarged perspective view of the unloader reactor shown in FIG. 1.
Figure 9:
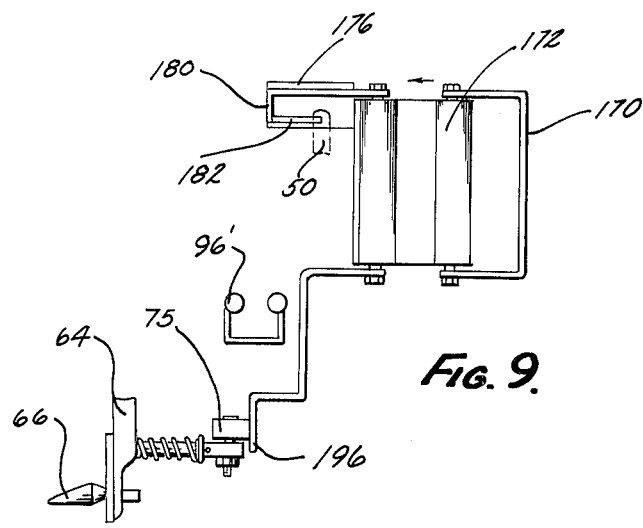
FIG. 9 is an end elevational view of the unit in FIG. 8.

The unloader unit 16 (FIGS. 8 and 9) is basically a unit reactive to an elevated master code pin to shift outwardly and longitudinally of the conveyor. This shift occurs under the force of the master pin, to react upon the load supported on the passing trolley.

The unloader includes a forwardly facing, generally U-shaped plate bracket 170 attached to channel element 80. The upper and lower flanges of bracket 170 have a pair of legs or hinges 172 and 174 pivotally connected thereto. To the outer ends of these hinges are attached the upper plate 176 of the unloader, and the lower plate 178. This assembly thus constitutes a three bar linkage, or i.e. a shiftable parallelogram linkage.

The upper plate 176 includes a downwardly extending frontal portion 180 which includes a horizontally tapering cam surface plate 182 extending inwardly from portion 180 toward the hinges. This slanted surface is in the path of an elevated master pin as shown in phantom in FIG. 9 at 50 so that, when the master pin is elevated, it forcefully shifts the assembly against the bias of a tension spring 190 extending between the plate 178 and bracket 80. This extension causes outward movement of the unloader surface 196 on the lower plate 178 toward the horizontal wheel 74 on the trolley. Surface 196, when so extended, shifts roller 74 laterally against the bias of compression spring 70 (FIG. 7) on the trolley, to push wiper 68 over pin 66, and thereby unload the load hanging on this pin. Sway of the trolley under these conditions is prevented by the horizontal guide stabilizer 96' (FIG. 9) in engagement with roller 62 on the trolley.

On the downstream end of unloader plate 176 is a downwardly slanting camming surface 198 which depresses elevated master pins that have caused the unloader to actuate. These are deactivated to prevent movement of each subsequent unloader by the same master pin.

OPERATION

The operation of the apparatus will be explained especially with respect to FIGS. 10, 11 and 12, although reference to the other figures to understand the detailed interrelationships will be made.

Referring to FIG. 10, when trolley 12 moves along the conveyor either by power chain 21 (FIG. 1) or by gravity, it approaches the first reader unit 14. The reader is in a retracted condition under the force of its tension biasing spring against its stop 112. From this condition, the code pins of the trolley are aligned with the diagonal camming surface 106 of the reader, and the master pin 50 is aligned with the downwardly slanting depressing cam surface 130.

Assuming that two levers, one each in groups 38a and 38b (FIG. 2) are depressed to elevate the pins "2" and "1" (FIG. 2) respectively of the two groups 40a and 40b, these pins are then preset to cooperate with the reading units along the line and to especially form an interengagement with a reading unit with slots spaced the same as these. (For purposes of convenience the elevated pins are illustrated in a darkened condition in FIGS. 10, 11 and 12.) As the trolley begins to interengage with the reader, the leading code pin "2" of group 40a contacts laterally diagonal surface 106 and forces the reader laterally and longitudinally on its parallelogram linkage against the force of tension spring 110 (FIG. 4). This leading elevated pin then rides along the back surface of flange 107. As this pin begins to move across surface 109, the follower code pin contacts surface 106 and holds the parallelogram reader extended.

The extension of this reader by the leading pin also pulls cam surface 140 with the reader into the path of the master pin, which is at this time still depressed. The master pin is shifted upwardly by this upwardly slanting surface to activate it or condition it into a triggering condition for the reactor unit downstream, provided the master pin is not subsequently depressed before it leaves the reader.

Figure 3:
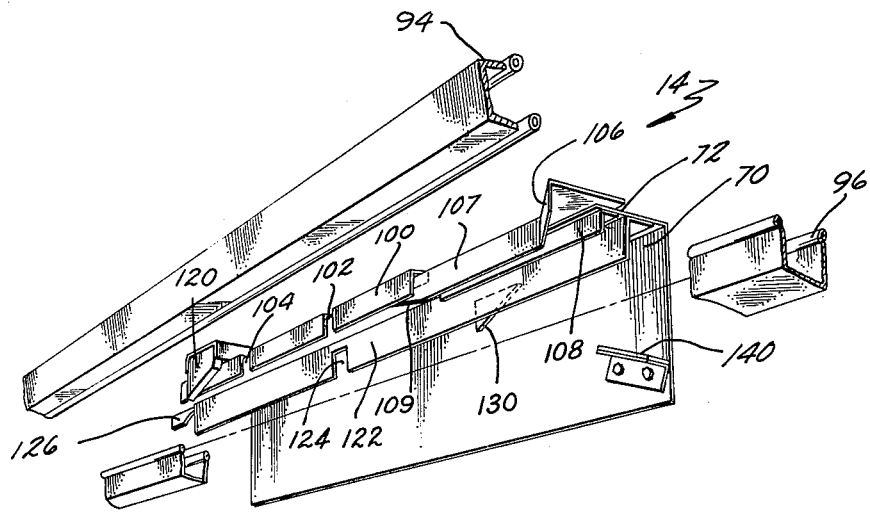
FIG. 3 is an enlarged perspective view of the reader-selector-conditioner unit illustrated as part of the apparatus in FIG. 1.

It will be noted that if only a lead code pin in group 40a is elevated, and a code pin in group 40b is not elevated, the lead code pin will pass along surface 107, then 109, then along the back side of flange 100 until slot 102 is reached. Since it matches slot 102 it will pass through the slot allowing the reader unit to retract. This retraction pulls cam 130 into the path of the master pin to depress it. Consequently, the unit passes on by the reader with the master depressed so as not to activate the unloader downstream. The lead pin is also depressed by surface 120 (FIG. 3). Consequently, the elevation of only the lead pin will not cause accidental unloading of the assembly. It is immediately inactivated to circulate freely until two code pins are preset.

Elevation of only the follower code pin in group 40b, and no corresponding lead code pin in group 40a will also not cause accidental unloading. By the time that the follower pin reaches slanted surface 106, the master pin is already past elevating cam 140, so that extension of the reader unit temporarily by the follower pin before it slips out the leading orifice 102 does not elevate the master pin. The follower code pin is depressed by surface 120 and the trolley will circulate freely.

When one code pin in each grouping is elevated, however, the trolley will interengage with each and every reader unit it passes until a matching reader unit is found. As the two elevated code pins ride along the back surface of flange 100, the master pin is elevated by the extended cam 140. It rides along the back surface of flange 122. The contact of the master pin and flange 122 then holds the reader extended. Since the flange 107 is offset slightly from reader flange 100 by surface 109 (FIG. 4), the code pins move behind but slightly spaced from surface 100. As the master pin reaches and coincides with central orifice slot 124, the master pin moves momentarily a slight amount into this slot to allow the reader to retract a very slight amount just sufficient to place the surface 100 against the elevated code pins. If the code pins do not match the slots in this flange 100, they, of course, cannot pass through them. A fraction of a second later the master pin moves again onto the back side of surface 122 to move flange 100 away from the code pins. As these code pins pass out the end of the unit they are still in their elevated position. The master pin, however, goes beneath the downwardly slanting cam 126 to depress it to an inactive condition. This is the case when the code pins do not match the code slots. It will therefore be realized that this master pin limits the reading action to the one brief interval when it passes by its slot 124.

If the two elevated code pins do match the code slots of the extended reader (FIG. 7 and FIG. 11) at the instant of reading, the code pins pass through slots 102 and 104, and the elevated master pin (shown darkened in FIG. 11) passes through slot 124, to the front sides of flanges 100 and 122, respectively. In this instance, the code pins are subsequently lowered by cam 120 to an inactive condition so that they will not actuate any additional reader units downstream. However, the master pin escapes from the reader unit without being depressed since it does not pass under cam 126. It therefore moves out of the reader unit in an active condition. This reader unit is therefore also a "selector" for the properly coded carrier, and a "conditioner" for the master pin on the selected carrier.

After this trolley passes the reader, the reader moves from its extended position (FIG. 11) to its retracted position (FIG. 12). The reader-selector-conditioner is then ready to receive the trolley following the one described. The trolley described then moves on to the reactor or unloader unit 16.

As mentioned previously this unloader is normally in its retracted position because of its tension spring 190. In this position the leading cam surface 182 is in alignment with the master pin 50 as illustrated by the phantom line illustrated in FIG. 10. If the master pin is in its lowered inactive condition as it emerges from the reader, it will not contact cam 182 since it will pass beneath it. Therefore, the unloader will not be actuated. The unloader is only actuated with an active or conditioned master pin in its elevated position. The elevated master pin contacts surface 182 to extend the unloader laterally and longitudinally of the conveyor. This extension also extends unloader surface 196. The unloader surface 196 is extended to bump roller 74, compress spring 70, and extend pin 72 and wiper 68. This unloads the support pin 66. As the master pin passes the reacted unloader, it contacts the downwardly slanting depressor 198 which moves the master pin to its lowered inactive condition. The unloaded empty trolley can then circulate freely without extending any of the readers or unloaders until it is again loaded and its code levers properly preset by an operator.

To be appreciated is the fact that a trolley with preset code pins "2" and "3" in groups 40a and 40b will not be selected by the reader unit slotted to select a trolley with preset code pins "1" and "2," for example, even though the respective pairs of pins are equally spaced, since the centrally located master pin must be adjacent to slot 124 at the instant the code pins are adjacent their slots in order for a selection to occur.

The unloader unit, simple in structure, and dependable in operation can be placed adjacent an unloading station or side conveyor while the reader can be placed any place upstream that is convenient, as long as there are no additional readers or unloaders intermediate it and its unloader.

The other advantages described previously in this application, and indeed several additional advantages, will be apparent to those in the art upon studying the preferred form of the invention illustrated. Also, various minor structural changes can conceivably be made in this apparatus to suit a particular situation or conveyor arrangement without departing from the novel concepts presented herein. Therefore, this invention is to be limited only by the scope of the appended claims, and the reasonably equivalent structures to those defined therein.

We claim:

1. A conveyor selector apparatus comprising: a selector and conditioning mechanism to be mounted adjacent a conveyor and including code reading and selecting means; a plurality of carriers to move along the conveyor, each including code means to match reading means on a predetermined selector; reaction means to be mounted along said conveyor downstream of said selector and positioned to cause a reaction with respect to a particular carrier when actuated; trigger means on said carrier cooperable with said conditioning mechanism upon a selection occurring between said code means and code reading means to cock said trigger means into an operative position; said trigger means in said operative position being cooperable with said reaction means to actuate it and cause a reaction with respect to said carrier.

2. A conveyor selector apparatus comprising: a reading station to be mounted adjacent a conveyor; at least one carrier to ride along the conveyor and controllably associate with said reading station; said carrier having pre-settable code means; said reading station having code reading means to operably associate with said code means; said carrier also having a pre-settable triggering means; said station having a trigger actuating means to cause said triggering means to leave said station in an active condition upon the occurrence of a matching coaction between said code means and code reading means; and load discharge means to be mounted along said conveyor downstream of said reading station and cooperative only with an active triggering means to discharge the carrier load.

3. A conveyor selector system comprising: a selector to be mounted adjacent a conveyor; a carrier unloader to be mounted along the conveyor downstream of said selector; a carrier to move along the conveyor and controllably associate with said selector and said unloader; said carrier having pre-settable code means, and having settable discharge actuator means; said selector having code reading means and having actuating means for said discharge actuator means to move it to an active position; said selector being shifted with a matching of said code means and code reading means to pass the carrier with the actuator means in the active position; and said carrier unloader being engageable with said actuator means when in its active position, to cause discharge of the load on the carrier.

4. A conveyor selector system comprising: a selector to be mounted adjacent a conveyor; a carrier unloader to be mounted along the conveyor downstream of said selector; a carrier to move along the conveyor and controllably associate with said selector and said unloader; said carrier having pre-settable code means, and having settable discharge actuator means; means on said reading selector shifted in response to pre-set code means of a passing carrier to move said actuator element to an active condition, and means on said selector to shift said element back to an inactive condition in the absence of a matching between said code means and said code reading means; said selector, upon the occurrence of a matching, being shiftable to a clearance condition allowing the carrier to pass with said element remaining in its active condition; and said carrier unloader being triggered by said element in its active condition to unload said carrier.

5. The apparatus in claim 4 wherein said unloader includes means to shift said actuator element back to its inactive condition as it passes.

6. A selective conveyor unloader system comprising: a plurality of load carriers to be mounted to move along a conveyor; a plurality of station selectors to be mounted along the conveyor for cooperation with passing carriers; and a plurality of carrier unloaders, one for each selector to be mounted downstream thereof along the conveyor, for cooperation with certain carriers selected by the respective selector; each of said carriers including load supporting means, a plurality of pre-settable code elements, and a settable master element movable between an inactive and an active position for controlling selective unloading of the carrier; each of said station selectors including code reading means cooperable with pre-set code elements of passing carriers; said station selectors each being shiftable against a bias by each passing carrier having pre-set code elements to physically associate said code elements with said code reading means; camming means on said station selector causing activation of said master element with shifting of said selector by said code elements; second camming means on said selector causing deactivation of said master element in the absence of a match between said code elements and said code reading means; said code elements and reading means being cooperative when matching to release said selector to return under said bias to its initial position; means allowing escape of said actuated master element past said second camming means with said selector return; camming means cancelling said code elements upon said selector return; said unloader having a camming surface in the path of an activated master pin and said unloader being shiftable thereby against a bias; discharging means on said unloader cooperable with said load supporting means to discharge the load therefrom when said unloader is shifted; said unloader being unresponsive to a master element in its inactive position; and master element inactivating means on said unloader to allow the carrier to circulate freely on the conveyor until pre-set for the next selection.

7. A carrier selective conveyor system comprising: conveyor means; coded load carriers mounted to move along said conveyor means; carrier selection means mounted along said conveyor to associate with said code carriers; said selector means including carrier conditioning means reactive with a carrier of a particular code to condition said carrier; and reactive means along said conveyor means downstream of said selection means cooperative only with conditioned carriers to cause a reaction with respect thereto.

8. A carrier selective conveyor system comprising: conveyor means; coded load carriers mounted to move along said conveyor means; carrier selection means mounted along said conveyor to associate with said code carriers; said selection means including carrier conditioning means reactive with a carrier of a particular code to condition said carrier; and unloader means along said conveyor means downstream of said selection means cooperative only with conditioned carriers to shift and unload them.

9. The system in claim 8 wherein each of said selection means and said unloader means comprises a parallelogram linkage shiftable along said conveyor means under the force of the passing carrier when interengaging therewith, and being biased to return to the initial position upon the passage of the carrier.

References Cited by the Examiner

UNITED STATES PATENTS 3,014,573   12/61   Baumann _____ 198—38

SAMUEL F. COLEMAN, *Primary Examiner.*